United States Patent [19]

Roberts

[11] 3,977,984

[45] Aug. 31, 1976

[54] CHEMICALLY REACTIVE RESIN BEADS AND TO METHODS OF THEIR MANUFACTURE

[75] Inventor: Roy Roberts, Lindfield, Australia

[73] Assignee: U.S. Philips Corporation, New York, N.Y.

[22] Filed: Oct. 23, 1975

[21] Appl. No.: 625,186

Related U.S. Application Data

[63] Continuation of Ser. No. 128,139, March 25, 1971, abandoned.

[30] Foreign Application Priority Data

Apr. 8, 1970  Australia.............................. 0849/70

[52] U.S. Cl............................ 252/62.54; 252/62.53
[51] Int. Cl.$^2$...................... C04B 35/04; H01F 1/26
[58] Field of Search..................... 252/62.53, 62.54; 210/37

[56] References Cited

UNITED STATES PATENTS

| 3,066,355 | 12/1962 | Schloemann et al. | 264/69 |
| 3,067,140 | 12/1962 | Davis | 252/62.54 |
| 3,117,092 | 1/1964 | Parker | 252/62.54 |
| 3,560,378 | 2/1971 | Weiss et al. | 210/37 |
| 3,629,118 | 12/1971 | Isserlis | 252/62.54 |

FOREIGN PATENTS OR APPLICATIONS 1,231,601   5/1971   United Kingdom

OTHER PUBLICATIONS

Encyclopedia of Polymer Science and Technology, Interscience, Pub. Corp., New York, vol. II, p. 3, vol. XII, pp. 66, 90.

Primary Examiner—F.C. Edmundson
Attorney, Agent, or Firm—Frank R. Trifari; Carl P. Steinhauser

[57]     ABSTRACT

Resin beads impregnated with magnetic powder, e.g. barium ferrite or $\gamma$-iron oxide magnetically aligned and located discretely with respect to each other are formed by suspending the beads in a liquid while polymerizing the resin and subjecting the beads to an aligning magnetic field during a portion of the process of polymerization of the resin at which the resin viscosity is sufficient to permit rotation of the magnetic particles and yet sufficiently high to prevent lateral movement, and hence clumping of the magnetic particles, e.g. a molecular weight range of between 1,000 and 10,000 and a viscosity of between 5 and 50 poise.

2 Claims, No Drawings

CHEMICALLY REACTIVE RESIN BEADS AND TO METHODS OF THEIR MANUFACTURE

This is a continuation of application Ser. No. 128,139, filed Mar. 25, 1971, now abandoned.

The present invention relates to materials comprising resin beads impregnated with magnetic powder and to methods of their manufacture. Although not restricted thereto the present invention relates, in particular to materials of the foregoing kind which are chemically reactive materials and more particularly to materials of the foregoing kind which are ion exchange materials. Such ion exchange materials are known and are used in water treatment processes.

An object of the present invention is to provide materials of the kind to which the invention relates having improved magnetic properties.

With materials comprising ion exchange resin beads of the kind impregnated with magnetic powder, advantage can be taken of small bead size which gives greater efficiency in the ion exchange mechanism and yet, since the beads have magnetic properties, flocculation of the beads will occur and will prevent loss of the beads. However, it is important to keep the magnetic powder content to a minimum in order to preserve efficiency and reduce costs of bead manufacture.

In accordance with one aspect of the present invention, a material comprising resin beads impregnated with magnetic powder particles is characterized in that the magnetic powder particles therein are magnetically aligned and are located discretely with respect to each other.

According to another aspect, materials in accordance with the invention are manufactured by forming the beads impregnated with magnetic powder and while suspended in a liquid the beads are subjected to an aligning magnetic field during a portion of the process of polymerization of the resin at which the resin viscosity is sufficiently low to permit rotation of the magnetic particles and yet sufficiently high to prevent lateral movement and hence clumping of magnetic particles.

Such conditions depend upon the composition of the polymer and its temperature at the time of subjection to the magnetic field but would fall within a molecular weight range of between 1,000 and 10,000 and a viscosity of between 5 and 50 poise.

Methods of producing chemically reactive resin beads of the kind to which the invention relates are described in an article entitled: "Some ion-exchange Processes for Partial De-Mineralisation" by N. V. Blesing et al. published as a pre-print by the Society of Chemical Industry, London, and distributed at the Ion Exchange Conference in London during July, 1969.

Generally speaking, the methods described in the article each consist of three stages as follows:

STAGE 1

A quantity of particles of magnetic material (e.g. barium ferrite or gemme ferric oxide) which has previously been treated to render the surface of the particles in a form preferentially wetted by the monomer is dispersed in an appropriate monomer (e.g. a mixture of polyethylenimine and epichlorhydrin together with hydrochloric acid as a promotor) the dispersion being carried out in a ball mill or some other suitable apparatus. The ratio of magnetic material to the monomer may be between 10 and 40% by weight depending upon the final magnetic properties desired.

STAGE 2

The resultant mixture from stage 1 is added to a paraffin oil containing 1% of a surfactant (e.g. the surfactant referred to in the aforementioned article as Atlas G 1702) which is then stirred in a high speed stirring apparatus to obtain a dispersion of the mixture in paraffin oil.

STAGE 3

The resultant dispersion for stage 2 is heated at 90° C for 16 hours and this causes polymerization of the monomer to occur resulting in the formation of the desired resin beads. The beads thus formed are removed from the paraffin oil by filtering. Thereafter, the beads are washed with a solvent (e.g. petroleum ether).

In the production of ion exchange resin beads of a mixture of polyethylenimine and epichlorhydrin by means of the three stage process outlined above, the invention may be applied as part of stage 3 by subjecting the resultant dispersion of stage 2 to an aligning magnetic field (i.e. a magnetic field of between 1 kilo gauss and 5 kilo gauss) for several seconds at a chosen period of time during the polymerisation of the monomer mixture. The magnetic field should be applied when the viscosity of the monomer mixture is sufficiently low to permit rotation of the magnetic particles but sufficiently high to prevent lateral movement and hence clumping of the particles. The precise period of time of subjection to the aligning magnetic field and the precise viscosity of the monomer mixture depends upon the composition of the mixture in question, upon the ratio of the monomer mixture to the magnetic powder content and upon the nature of the magnetic powder and must therefore be determined by empirical methods. It is expected however, that the magnetic field should be applied when the molecular weight range of the monomer mixture is between 1,000 and 10,000 and when the monomer mixture has a viscosity of between 5 and 50 poise. Such conditions would be expected to exist at approximately 12 hours after the commencement of stage 3 i.e. after the resultant dispersion from stage 2 has been heated at 90° C for 12 hours. After removal of the magnetic field, the remainder of stage 3 is completed by continuous of heating at 90° C for the remaining 4 hours followed by filtering and washing of the beads with a solvent.

It will be appreciated that by employing the invention, the resultant magnetic field of an individual resin bead will be considerably increased. Accordingly, if desired, the contents of the magnetic material in beads embodying the invention may be reduced in order to produce beads having the same magnetic field as beads not embodying the invention. Therefore, depending upon the magnetic properties desired, the magnetic material quantities mentioned in stage 1 of the foregoing may be reduced accordingly.

Methods of producing materials of the kind to which the invention relates and which are ion exchange materials are also described in British Patent No. 1,231,601. The present invention may be applied to examples 3, 4, 5 and 6 referred to in the British Patent by applying an aligning magnetic field during the polymerization stage of the respective examples.

Example I, which follows, describes a method of producing resin beads in accordance with the present invention and Example II, which follows, describes a method of producing an ion exchange material in accordance with the invention which has similar chemical properties to example 5 of the British Patent and may thus be compared therewith.

EXAMPLE I

In a suitable 3 necked flask fitted with a mechanical stirrer, a thermometer and a reflux condenser and heated by a suitable bath (120° ± 5°) place 376 g (4 moles) of phenol and 390 ml of commercial formalin (equivalent to 5.2 moles at 36% formaldehyde concentration). Add a solution of 3.2 gms sodium hydroxide dissolved in 20 cc water. Allow the reaction to proceed with stirring for 45 minutes after the beginning of reflux. Immediately after the end of 45 minutes, cool the reaction by immersing the flask in a bath of cold water. The product from this reaction is used hereinafter as Syrup A.

To 200 g of Syrup A are added 60 g of $\gamma$ Ferric Oxide (e.g. the material supplied under the trade name "IRN 110" by C. K. Williams, Easton, Pa. U.S.A.) 5 g of Polyoxyethylene sorbitan mono oleate (e.g. the material supplied under the registered trade mark "Tween 80" by Atlas Chemical Co., Wilmington, Del. U.S.A.) and 35 ml of water. The mixture is ballmilled until the ferric oxide is completely dispersed. This pigment mixture is used hereinafter as Paste A.

In a 400 ml container 150 ml of silicone oil (e.g material supplied under the trade mark "DC 200/100" by Dow Corning Corp., Midland, Mich. U.S.A.) are blended with 0.75 g microfine silica (e.g. material supplied under the registered trade mark "Santosil Z" by Monsanto, St. Louis, Mo. U.S.A.) using a higher speed stirrer. Into the mixture is introduced 30 g of Paste A and 28 g of Syrup A which have been previously mixed. The stirrer is run until the whole is thoroughly blended and the temperature of the contents of the container is then raised to 130° C; at an interval of 40 minutes from the commencement of heating, a coil surrounding the container is activated with a suitable current to achieve a field strength through the liquid of approximately 1 Kilo-Oersted for a period of 5 seconds. After a total period of 60 minutes at this temperature the mixture is allowed to cool, the silicone oil is diluted with an equal volume of petroleum ether and the resin beads are separated off. The resin bead mass is washed with further quantities of petroleum ether and then finally with acetone. The mass is dried and sieved to obtain a fraction between 100 and 200 mesh. A sample of the beads when examined show the results in Table I. Rate of settling was examined by shaking 2 gm of beads in water in a 15 × 2.5 cm test-tube after treatment in a 1.5 Kilo-Oersted field and examined after one minute standing. Distribution was obtained by microscopic examination of beads.

TABLE I.

| Rate of settling | Distribution of magnetic particles |
|---|---|
| 5.0 cm | fine strings |

Table II shows the results of similar mixtures subjected to a similar 5 second magnetic treatment but at an interval (as shown in the Table) which is other than 40 minutes from the commencement of heating.

TABLE II.

| Start of Magnetic Treatment | | Rate of settling | Distribution of Magnetic Particles |
|---|---|---|---|
| 10 mins. from commencement of heating | | 8.5 cm | clumped |
| 15 | " | 8.5 cm | " |
| 20 | " | 8.5 cm | " |
| 25 | " | 8.2 cm | " |
| 30 | " | 8.0 cm | " |
| 35 | " | 6.5 cm | strings |
| 45 | " | 7.5 cm | even |
| 50 | " | 8.0 cm | even |
| 60 | " | 8.0 cm | even |

Table III shows the results of again similar mixtures subjected to magnetic treatment for a period other than 5 seconds (as shown in the Table) started at an interval 40 minutes after the commencement of heating.

TABLE III.

| Period of Magnetic Treatment | Rate of settling | Distribution of Magnetic Particles |
|---|---|---|
| 2 Seconds | 7.0 cm | strings |
| 10 Seconds | 8.0 cm | clumped |

EXAMPLE II

A 500 ml flask is fitted with a condenser, thermometer and stirrer and immersed in a water bath adapted to be heated. With the stirrer running and cold water in the bath the following materials are introduced into the flask in sequence. Commercial fomalin 190 ml, phenol 95 g, sodium bisulphite 27.5 g sodium sulphate (anyvdrous) 32 g. A vigorous reaction ensues. When this initial reaction subsides the temperature of the flask contents are raised to 90° C and maintained at this temperature for 1½ hours. The resulting syrup is cooled and transferred to a ballmill with the addition of 50g of $\gamma$ Ferric Oxide and 4.0 g of cetyl pyridinium chloride. After the magnetic powder is thoroughly mixed the mass is warmed to 90° C and poured into a heating vessel containing 1000 ml of silicone oil and 0.5% santosil Z (registered Trade Mark) using a high speed stirrer to ensure complete dispersion. The mixture is heated to 105° and at an interval of approximately 40 minutes from the start of the final heating the mass is subjected to 1.0 Kilo-Oersted magnetic field in a manner similar to that of Example I above for a period of 5 seconds. Heating is continued to a total of 1 hour, the mass is then cooled, thinned by the addition of 1000 ml of petroleum ether and the beads separated off. The beads are washed with further petroleum ether, then with ethyl acetate, dried and sieved to obtain a fraction passing a 70 mesh sieve but retained by a 120 mesh sieve.

When compared for settling rate and for dispersion of particles in a manner similar to Example I the sample had a settling height at 20 seconds of 5 cm.

In Examples I and II, as an alternative to subjecting the mass to magnetic treatment by means of a coil surrounding the container in the manner described, the mass may be treated by passing through a tube which is surrounded by a coil generating a 1.0 Kilo-Oersted magnetic field within the tube whereupon the mass is returned to the heating vessel.

Other methods of performing the invention than that described in relation to the aforementioned article and than those described in Examples I and II are possible. For instance, instead of achieving polymerization by heating, it is known to achieve polymerization by radiation methods. The invention may be applied by subjection of the dispersion to a magnetic field at an appropriate portion of the radiation process. This, and other variations which will be readily apparent to persons skilled in the art, are intended to be included within the scope of the present invention.

What is claimed is:

1. A material comprising resin beads of a condensation polymers selected from the group consisting of polyethylenimine-epichlorohydrin polymer and phenolformaldehyde polymers impregnated with particles of a ferromagnetic material selected from the group consisting of γ-ferricoxide and barium ferrite, magnetically aligned and located discretely with respect to each other when the polymer has a molecular weight between 1000 and 10,000.

2. A method of manufacturing resin beads impregnated with magnetic powder particles magnetically aligned and located discretely with respect to each other comprising the steps of forming beads of a condensation polymer selected from the group consisting of polyethylenimine-epichlorohydrin polymers and phenolformaldehyde polymers impregnated with particles of a ferromagnetic material selected from the group consisting of gamma ferric oxide and barium ferrite, suspending the polymer beads impregnated with the ferromagnetic material in a liquid, polymerizing the resin to harden the same, and subjecting the beads suspended in the liquid to an aligning magnetic field during a portion of the process of polymerization of the polymer when the molecular weight of the polymer is between 1000 and 10,000 and the polymer has a viscosity between 5 and 50 poise to permit rotation of the magnetic particles and prevent lateral movement and hence clumping of magnetic particles.

* * * * *